Nov. 2, 1926.

F. W. McDONALD ET AL 1,605,847

AUTOMATIC WARE MAKING MACHINE

Filed Oct. 27, 1923      8 Sheets-Sheet 2

Inventors:-
Frank W. McDonald,
Dempsey L. Riehl.
By their Attorneys.
Howson & Howson.

Nov. 2, 1926.　　　　　　　　　　　　　　　　1,605,847

F. W. McDONALD ET AL

AUTOMATIC WARE MAKING MACHINE

Filed Oct. 27, 1923　　　8 Sheets-Sheet 3

Inventor-
Frank W. McDonald
Dempsey L. Beehl
by their Attorneys

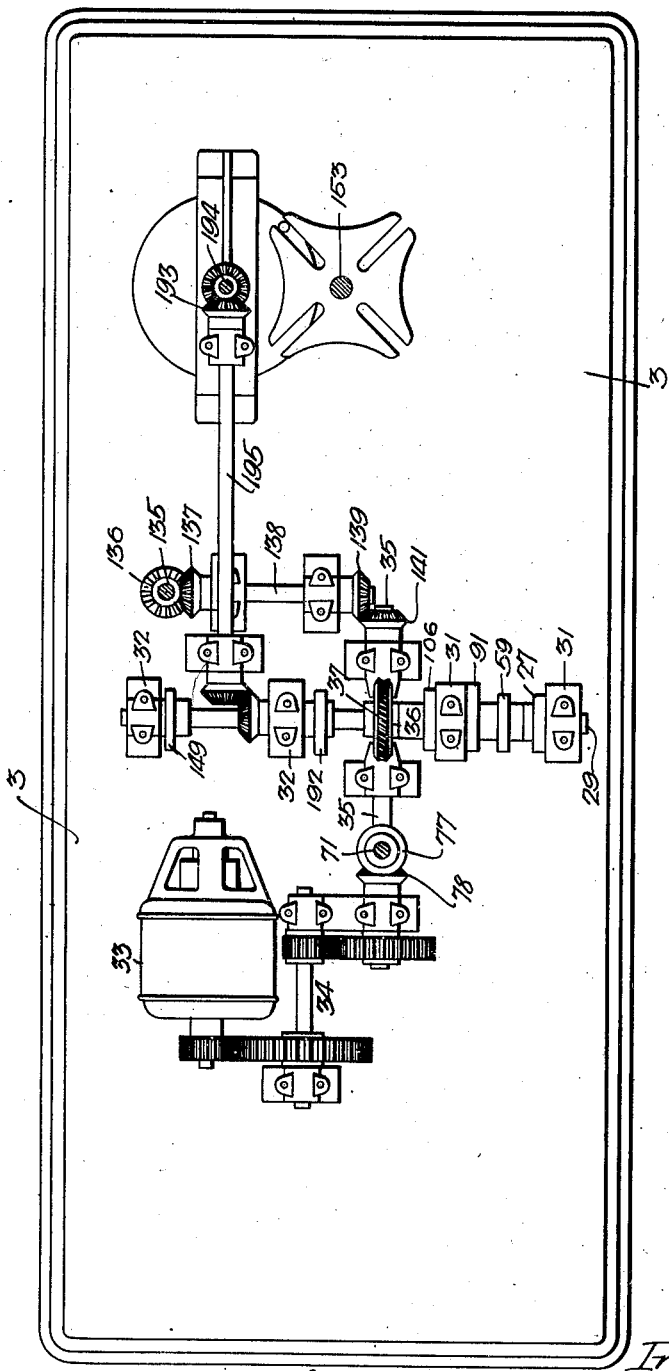

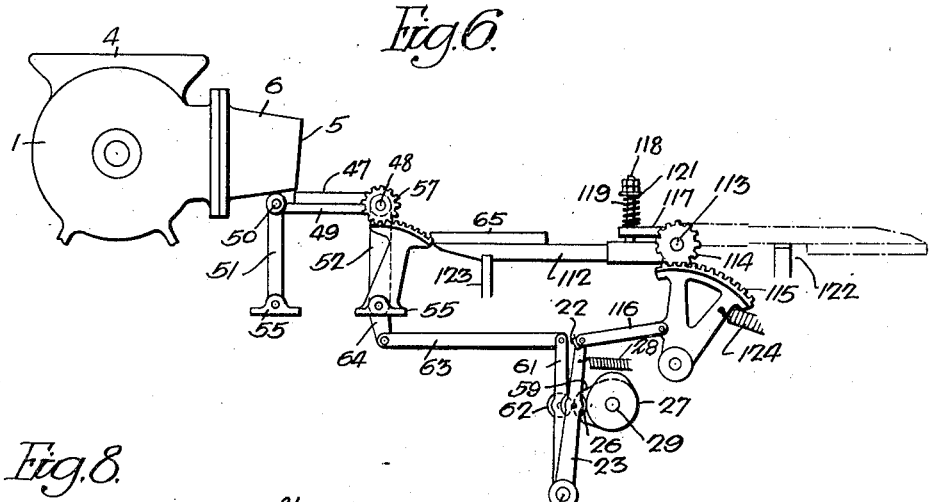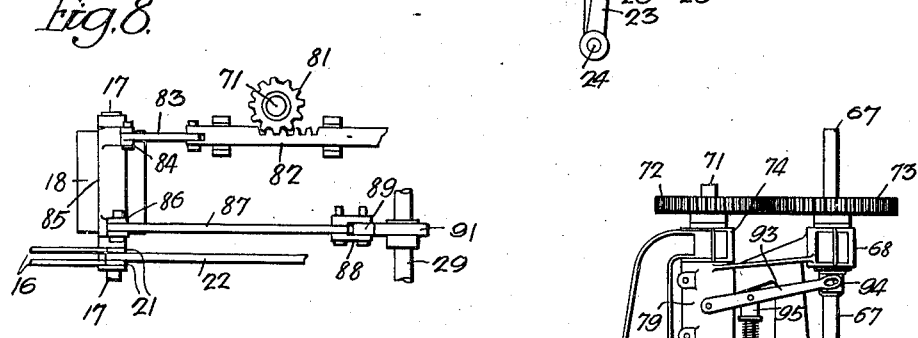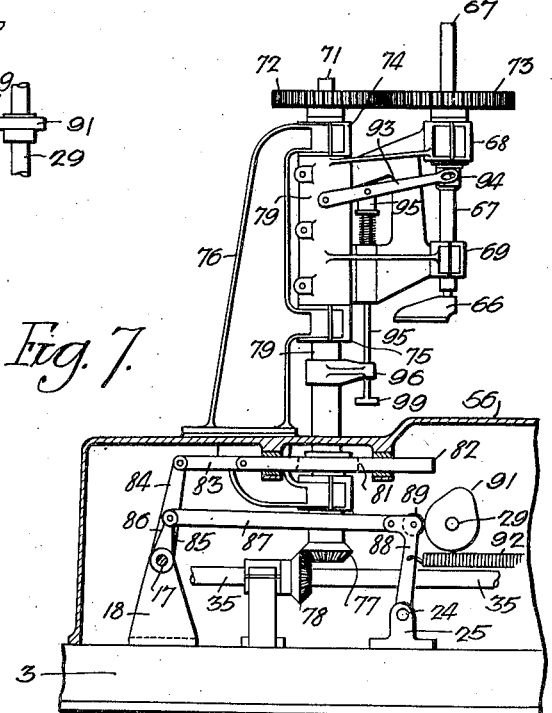

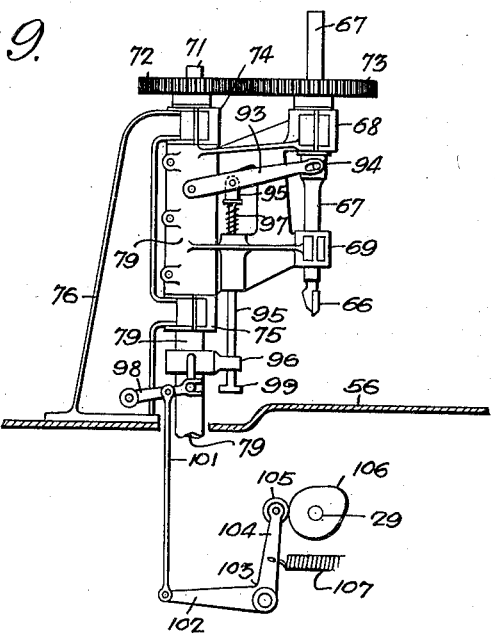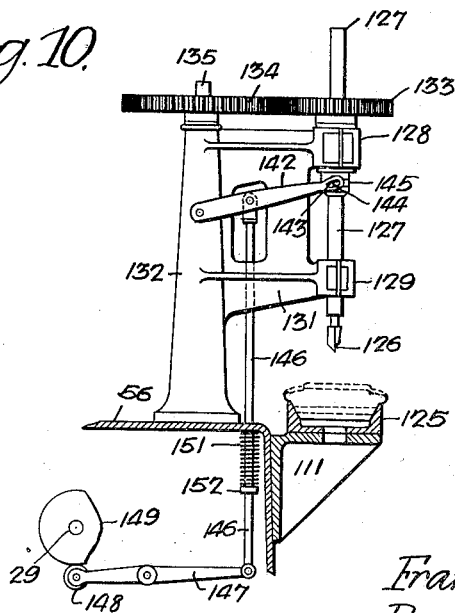

Nov. 2, 1926.

F. W. McDONALD ET AL 1,605,847

AUTOMATIC WARE MAKING MACHINE

Filed Oct. 27, 1923  8 Sheets-Sheet 7

Inventors.—
Frank W. McDonald.
Dempsey L. Reehl.
by their Attorneys.
Howson & Howson.

Nov. 2, 1926.

F. W. McDONALD ET AL 1,605,847

AUTOMATIC WARE MAKING MACHINE

Filed Oct. 27, 1923    8 Sheets-Sheet 8

Inventors:
Frank W. McDonald,
Dempsey L. Reehl.
by their Attorneys
Howson & Howson.

Patented Nov. 2, 1926.

1,605,847

UNITED STATES PATENT OFFICE.

FRANK W. McDONALD AND DEMPSEY L. REEHL, OF NEW BRIGHTON, PENNSYLVANIA, ASSIGNORS TO PROCTOR & SCHWARTZ, INCORPORATED, OF PHILADELPHIA, PENNSYLVANIA, A CORPORATION OF PENNSYLVANIA.

AUTOMATIC WARE-MAKING MACHINE.

Application filed October 27, 1923. Serial No. 671,146.

Our invention relates to automatic machinery, having particular relation to waremaking machinery.

In its broadest aspect, the object of our invention is to provide a machine for making such ware as plates, saucers, cups, bowls, etc., directly from clay.

A more specific object of our invention is to provide a machine of the class specified, wherein the several operations incident to the production of the finished ware occur automatically in predetermined timed sequence.

Another object of our invention is to provide an automatic ware-making machine which is characterized, among other things, by the uniformity of the finished ware.

A further object of our invention is to provide a machine of the above-described class in which the operations of making a bat and molding the ware are combined in one, to obviate the handling of the clay between the two operations.

According to our invention, we provide an automatic machine of the class specified, wherein the following operations occur in predetermined sequence: (1) The repugging and formation of the clay into cylindrical form; (2) The cutting of disks of clay therefrom and the placing of the same on a batting-out head; (3) The formation of the bat; (4) The transferring of the bat from the batting-out head to a mold; (5) The moving of the mold with the bat under a finishing tool, by means of automatic-feeding apparatus; (6) The making of the ware; and (7) The removing and the replacing of the molds by said automatic-feeding apparatus. (Operations 5 and 7 occur simultaneously).

With these and other objects and applications in mind, our invention further consists in the details of construction and operation hereinafter described and claimed and illustrated in the accompanying drawings, wherein—

Fig. 5 is a detail, top plan view, partially in section, of the tool and the automatic feeder driving means;

Fig. 6 is a detail side elevational view of the disk-forming and batting-out head mechanism.

Fig. 7 is a transverse sectional view of the bat-forming tool and the mechanism for moving said tool in a horizontal plane toward and away from the bat, the sectional plane being taken on the line VII—VII of Fig. 2;

Fig. 8 is a detail top plan view of a part of the actuating mechanism of Fig. 7;

Fig. 9 is a view similar to Fig. 7 but showing the mechanism for raising and lowering the bat-finishing tool;

Fig. 10 is an end elevational view, partially in section, of the ware-finishing tool and the actuating mechanism therefor;

Figure 1:
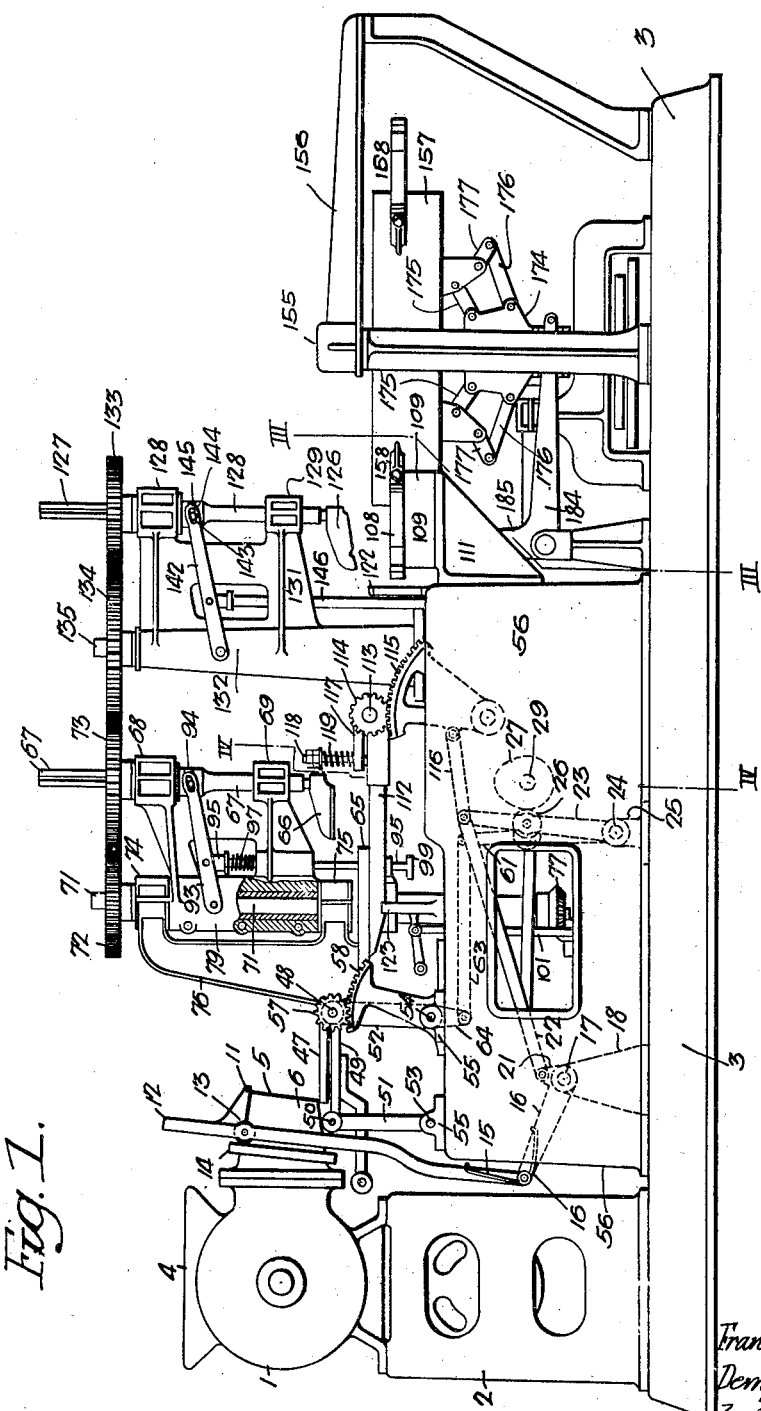
Fig. 1 is a side elevational view, partially in section, of a ware-making machine embodying our invention.
Figure 2:
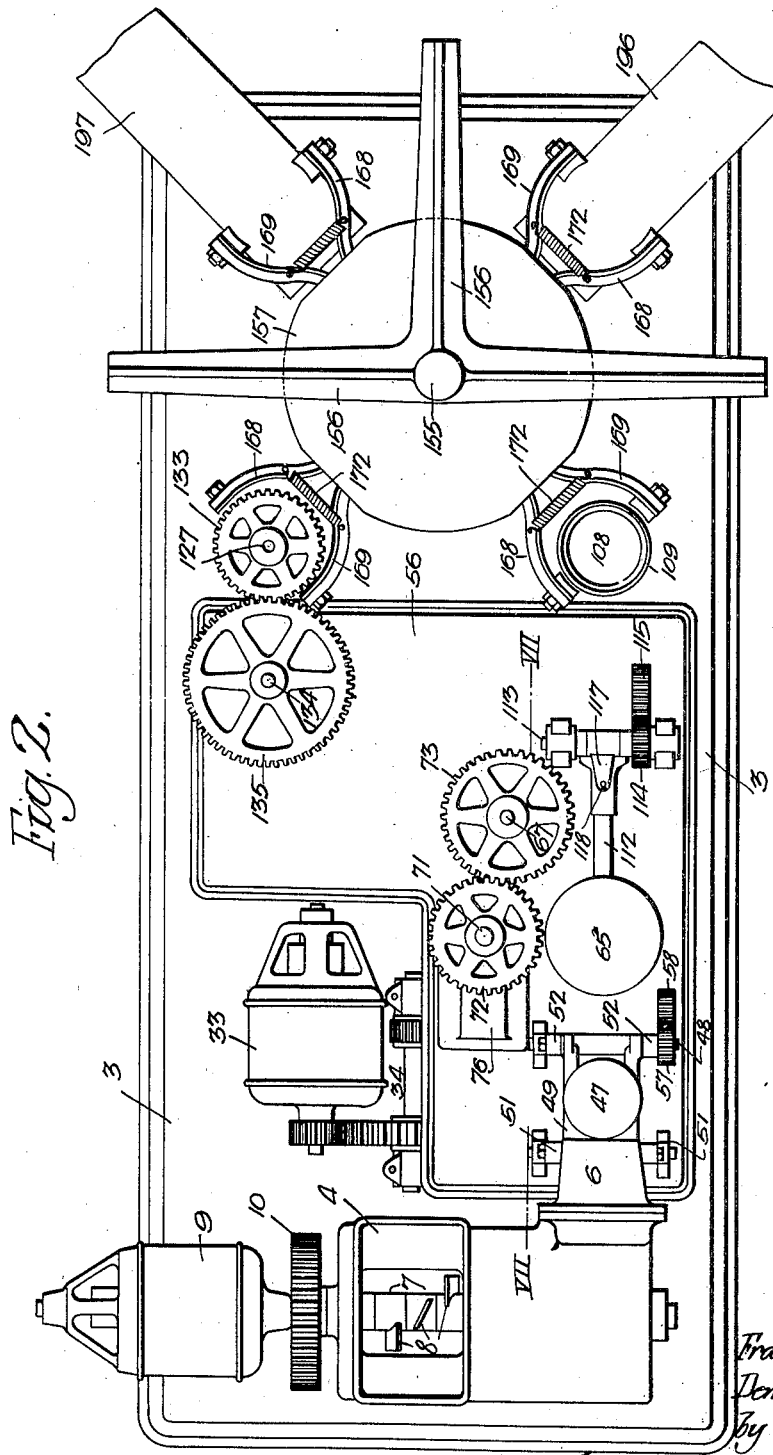
Fig. 2 is a top plan view of the apparatus of Fig. 1.
Figure 3:
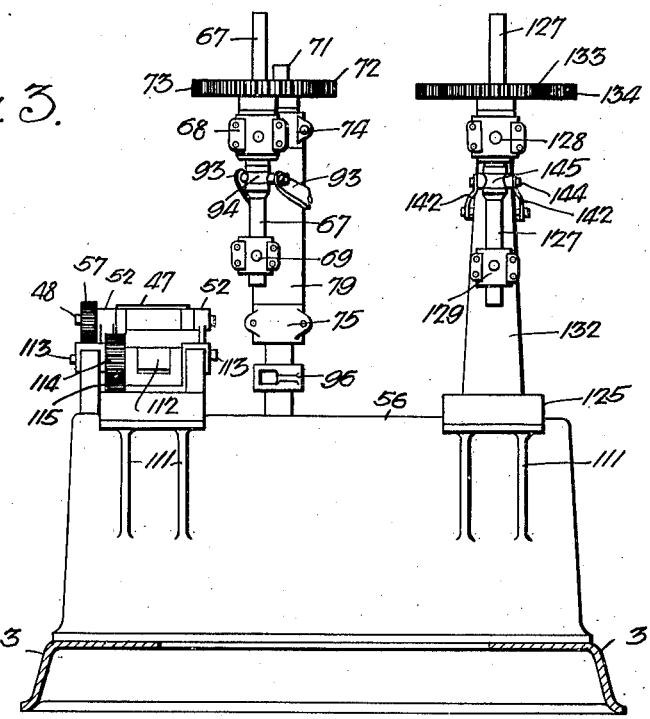
Figs. 3 and 4 are transverse sectional views taken along the line III—III and IV—IV, respectively, of Fig. 1.

In the illustrated form of embodiment of our invention shown in the drawings, a pug-mill 1 (Figs. 1 and 2) is mounted on a sub-base 2, which is positioned at one end of a longitudinally extending main base 3, and it is provided with an inlet opening 4, which is designed to receive the clay to be operated on, and an outlet opening 5 through a die 6. A horizontally extending shaft 7 of the pug-mill 1 is provided with knives 8, which are driven by a motor 9 through a gear-wheel mechanism 10, the knives 8 operating to force the clay from the pugmill 1 through the die 6. In practice, the motor 9 is operated intermittently, each operating period being of such duration as to allow the knives 8 to force through the die 6 an amount of clay necessary for a disk of the desired thickness, all as will be explained more fully hereinafter. The foregoing constitutes the first operation.

The second operation of cutting off a disk of clay from the mass extending beyond the die 6 is accomplished by means of a wire 11 which is movable back and forth across the face of the die 6. The movement of the wire 11 is accomplished by mounting the same on a frame 12 which is provided with rollers 13 held in engagement with a track 14 by means of a spring 15. The frame 12 is pivotally mounted on a lever 16 which in turn is pivotally mounted on a pin 17 carried by a pedestal 18, the latter being mounted on the main base 3. The lever 16 is provided with an extension 21 which is associated by means of a link 22 with the free end of a lever 23 pivotally mounted on a pin 24 carried by a pedestal 25 also supported on the main base 3. A roller 26 is mounted intermediate the ends of the lever 23 and it is held in resilient engagement with the periphery of a cam 27 by means of a spring 28. The design of the cam 27 is such that, for one complete rotation thereof, the wire 11 is moved once downwardly and upwardly across the face of the die 6.

Figure 4:
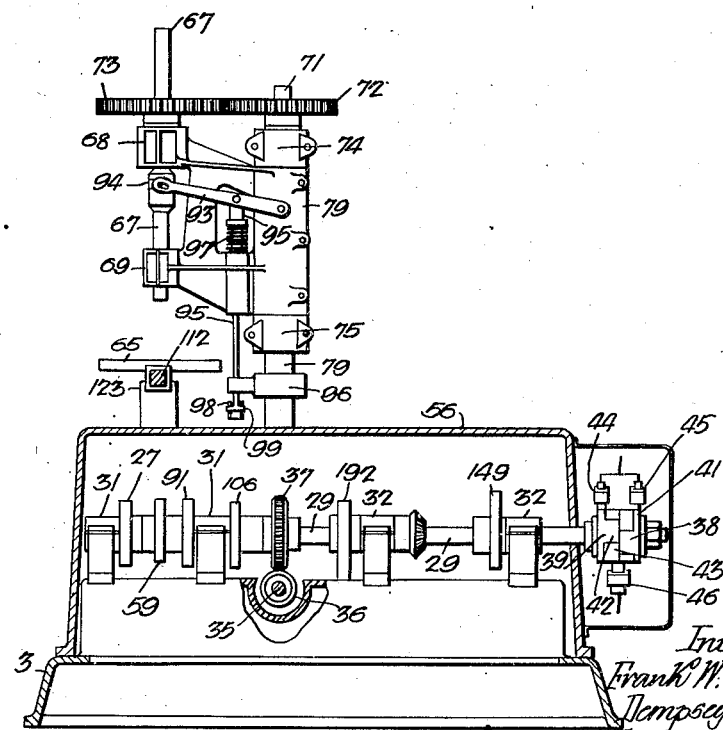

The cam 27 is rigidly secured on a cam-shaft 29 (Fig. 4) which is revolvably mounted in bearings 31 and 32 positioned on opposite sides of the main base 3. The cam-shaft 29 may be driven by means of a motor 33 (Fig. 5) through a reduction gear-wheel mechanism 34, a shaft 35 and a worm 36 and wheel 37 mounted, respectively, on the shaft 35 and the cam-shaft 29.

The cam-shaft 29 is provided with a circuit interrupter 38 (Fig. 4) on the outer end thereof designed to periodically interrupt the energizing circuit (not shown) of the pug-mill driving motor 9, whereby the pug-mill 1 may be operated just long enough to force a desired amount of clay through the die 6. The interrupter 38 comprises a pair of independently movable rings 39 and 41, the surfaces of which comprise copper and fiber portions 42 and 43, respectively. The interrupter 38 further comprises a pair of carbon brushes 44 and 45, which are so positioned as to contact only with the copper surface portions 42, on the rings 39 and 41, respectively, and a third carbon brush 46 which is so positioned as to intermittently engage the copper surface portions 42 and the fiber portions 43 of both rings 39 and 41. The period of contact and consequently the operating period of the motor 9 may be varied by adjusting one ring relative to the other.

When the disk of clay has been cut from the die 6 by the wire 11, it falls on a horizontally positioned table 47 (Fig. 6) which is rigidly secured at one end to a shaft 48. The shaft 48 is revolvably mounted on one end of a second horizontally positioned table 49, having pins 50 at the other end thereof. The table 49 may be pivotally supported by vertically positioned arms 51 and 52, the upper ends of which engage the pins 50 and the shaft 48, respectively. The lower ends of the vertical supports 51 and 52 may be mounted, respectively, on pivot pins 53 and 54, respectively, which, in turn, are journaled in brackets 55 mounted on a sub-base 56 positioned intermediate the ends of the main base 3. The vertical supports 52, however, are rigidly secured to the pivot pin 54, distinguishing from the pivotal mounting of the supports 51 on the pins 53. As may readily be seen, the foregoing construction provides for a limited horizontal movement of the tables 47 and 49.

A pinion 57 is mounted on the outer end of the shaft 48 and it is adapted to mesh with a segmental gear 58 which is rigidly mounted on the sub-base 56, whereby a horizontal movement of the table 49 may cause a turning movement of the shaft 48, and, as a consequence, a vertical turning movement of the table 47. The horizontal movement of the table 49 just mentioned may be caused by a cam 59 (Fig. 4) and interconnecting linkage comprising a lever 61, which is pivotally mounted, at one end, on the shaft 24. A roller 62 is mounted on the lever 61 intermediate the ends thereof and it is adapted to engage the periphery of the cam 59. The other end of the lever 61 is operatively associated by means of a link 63 with a lever 64, which is rigidly secured to the pin 54, whereby, when the cam 59 is turned, the supporting arms 52 and, consequently, the table 49 may be horizontally reciprocated and the vertical turning movement of the table 47 ensue. As the table 47 is turned, the disk carried by the same is thrown on a batting-out head 65, the operation of which will be described more fully hereinafter.

The formation of the bat constituting the third operation is now brought about by a bat-finishing tool 66 (Fig. 1) which is rigidly secured on a vertically positioned spindle 67 rotatably and slidably mounted in spaced bearings 68 and 69. The upper end of the spindle 67 is operatively associated with a vertically positioned driving shaft 71 by means of gear-wheels 72 and 73. The driving shaft 71 is revolvably mounted in spaced bearings 74 and 75 on a supporting frame 76 which is mounted on the sub-base 56. The lower end of the shaft 71 is provided with a bevel gear-wheel 77 (Figs. 1 and 5) which meshes with a bevel gear-wheel 78 mounted on the motor-driven shaft 35.

According to our invention, the bat-finishing tool 66 is first moved in a horizontal plane from a position to one side of the batting-out head 65 to a position directly over the same and thereafter lowered to engage the disk. To this end, we have mounted the spindle bearings 68 and 69 on a sleeve 79 adapted to embrace a portion of the vertical driving shaft 71 intermediate the bearings 74 and 75 and to be journaled therein. The sleeve 79 may be extended below the bearing 75 and a pinion 81 (Figs. 7 and 8) mounted on the lower end thereof. The pinion 81 meshes with a rack 82 which is connected by means of a link 83 with an arm 84 of a lever 85, another arm 86 of which is connected by means of a link 87 with a lever 88 pivotally mounted on the shaft 24. The lever 88 is provided with a roller 89 which engages the periphery of a cam 91 rigidly secured on the cam-shaft 29 and it is held in resilient engagement therewith by means of a spring 92.

The design of the cam 91 is such that motion of the same through a part of a revolution causes a horizontal movement of the bat-finishing tool 66 from a position to one side of the batting-out head 65 to a position directly over the same. This position is maintained for a further movement of the cam 91, during which time interval the bat-finishing tool 66 is moved into and out of engagement with the disk by mechanism to be described hereinafter. Further movement of the cam 91 through the remainder of the revolution causes a horizontal swinging movement of the tool 66 back to its original position.

The tool 66 may be brought into engagement with the disk on the batting-out head 65, when it has been moved to a position directly over the same, by means of mechanism comprising a lever 93 (Fig. 9), which is pivotally mounted on the sleeve 79 at one end and which is operatively secured to a yoke 94 at the other end thereof. The yoke 94 is loosely mounted on the spindle 67 intermediate the bearings 68 and 69 but secured against axial movement relative thereto.

A vertically positioned rod 95 has the upper end thereof pivotally mounted on the lever 93 and the lower end thereof supported by a bracket member 96 which is loosely mounted on the sleeve 79. A spring 97, which embraces the upper end portion of the rod 95, serves to resiliently hold the tool 66 in a raised position. A lever 98, which is pivotally mounted on the vertically upright frame 76 is provided with a forked end portion adapted to engage a lateral projection 99 on the vertical arm 95 when the tool 66 is horizontally moved to the desired position over the disk on the batting-out head 65. The lever 98 may be raised and lowered to correspondingly move the tool 66 by means of a link 101 which is connected to an arm 102 of a pivotally mounted bell-crank lever 103. The other arm 104 of the bell-crank lever 103 is provided with a roller 105 which is held in resilient engagement with a cam 106 on the cam shaft 29 by means of a spring 107.

The design of the cam 106 is such that motion of the same causes, through the linkage just described, the lowering of the tool 66 into engagement with the disk on the batting-out head 65 whereby one side of the disk may be finished to form the bat. After the bat has been formed, further motion of the cam 106 through the remainder of the revolution causes the tool 66 to be raised to its original position. The position of the cam 106 on the cam-shaft 29 with respect to that of the cam 91 is such that the raising and lowering operations just described occur only while the tool 66 is positioned over the disk on the batting-out head 65.

The fourth operation, wherein the bat in transferred from the batting-out head 65 to a mold 108, which is removably positioned in a mold-holder 109 supported on a bracket 111 secured to one end of the sub-base 56, is now brought about by reason of the following mechanism: An arm 112 (Fig. 6) which has rigidly secured to one end thereof the batting-out head 65, is pivotally mounted on a shaft 113 which carries at one end thereof a pinion 114. The pinion 114 meshes with a pivotally-mounted segmental-gear 115 which is actuated by the cam 27 through a link 116 and the pivotally mounted lever 23.

A resilient connection between a lug 117, which is rigidly secured on the pinion-shaft 113, and the arm 112, which is pivotally mounted on the pinion-shaft 113, comprises a rod 118, which extends from the arm 112, and a spring 119, the opposite ends of which abut the lug 117 and a shoulder 121 formed on the end of the rod 118. The limiting positions of the batting-out head 65 may be determined by stop members 122 and 123. A spring 124 secured to the segmental-gear 115 serves to return the batting-out head 65 from its advanced position, which is shown in Fig. 6 of the drawings in dotted line, to its normal position, which is shown in solid line.

When the cam 27 is turned, the segmental-gear 115 is correspondingly moved, causing the batting-out head arm 112 to turn through substantially an angle of 180°. When the arm 112 is actuated into engagement with the stop member 122, the bat is thrown from the batting-out head 65 into the mold 108 (Fig. 2) with a force dependent upon the tension of the spring 119. Further movement of the cam 27 causes the return of the batting-out head to its original position. The relative position of the cams 27, 91 and 106 is such that cam 27 is operative to move the batting-out head 65 only when the cams 91 and 106 have operated to move the bat-finishing tool 66 out of vertical alignment therewith.

The fifth operation of moving the mold 108 from the mold-holder 109 to a second mold-holder 125 (Fig. 10) which is also mounted on the supporting bracket 111, is performed by automatic-feeding apparatus which will be described more fully hereinafter.

The sixth operation of forming the bat into finished ware is accomplished by mechanism comprising a ware-finishing tool 126 (Fig. 10) which is mounted on a spindle 127 rotatably and slidably mounted in spaced bearings 128 and 129 supported on a bracket 131 extending from a hollow pedestal 132. The upper end of the spindle 127 is provided with a gear-wheel 133 which meshes with a gear-wheel 134 mounted on a vertical shaft 135 revolvably mounted within the pedestal 132. The lower end of the upright shaft 135 is provided with a bevel gear-wheel 136 (Fig. 5) which meshes with a bevel gear-wheel 137 on a shaft 138. The shaft 138 is operatively associated by means of a bevel gear-wheel 139 with a bevel gear-wheel 141 on the motor-driven shaft 35.

The ware-finishing tool 126 may be lowered into engagement with the bat in the mold-holder 125 to form the finished ware and thereafter raised by means of a lever 142, which is pivotally mounted on the pedestal 132 at one end and which is provided with a slot 143 containing a pin 144 at the other end, the pin 144 projecting from a yoke 145 loosely mounted on the spindle 127 and secured against axial movement relative thereto, as in the case of the lever 93 in Fig. 9. A vertically positioned arm 146 extends from a substantially mid-point on the arm 142 through an opening in the sub-base 56 to one end of a centrally pivoted arm 147, the other end of which is provided with a roller 148 adapted to engage the periphery of a cam 149. A spring 151, which has one end thereof abutting the sub-base 56 and the other end thereof abutting a shoulder 152 positioned on the vertical arm 146, serves to exert a downward force on the arm 146 tending to hold the ware-finishing tool 126 in engagement with the bat which, however, is prevented by the cam 149 and lever 147.

The design of the cam 149 is such that when the cam 149 is turned for a part of a revolution, the arm 146 is permitted to move downwardly under the force of the spring 151, thereby lowering the tool 126 into engagement with the bat. This position is maintained until the ware is finished, whereupon the continued turning of the cam 149 causes the raising of the arm 146 and, consequently, the ware-finishing tool 126 out of engagement with the finished ware.

The previously mentioned automatic-feeding apparatus, for simultaneously performing the fifth and seventh operations, wherein molds are automatically removed from the mold-holders 109 and 125 and replaced by other molds, comprises a vertically positioned shaft 153 (Figs. 11 and 12) which is revolvably mounted at the lower end thereof in a bearing 154 formed in the main base 3, and which is similarly mounted at the upper end thereof in a bearing 155 carried by supporting arms 156, extending from the main base 3. A supporting table or head 157 is mounted on the shaft 153 near the upper end thereof and it is designed to pivotally support four jaw mechanisms 158 which are equiangularly spaced with respect to the vertical shaft 153.

The jaw mechanisms 158 each comprise a block 159, which is provided at one end with a longitudinally extending recess 161 adapted to slidably receive and hold a bar 162, the outer end of which is provided with a shoulder against which presses a spring 163 tending to force the bar 162 out of the recess 161. This is avoided by providing the inner end of the bar 162 with shoulder portions 164 which engage inner sides of the block 159 adjacent to the recess 161. The inner end portion of the slidable bar 162 may also be provided with rollers 165 adapted to engage the oppositely projecting portions 166 and 167 of jaw elements 168 and 169, respectively, which are pivotally mounted on a pin 171 carried by the block 159. A spring 172, which extends between the jaw elements 168 and 169, serves to draw the same together. The member 159 may be pivotally mounted on the supporting table 157 by means of a pin 173 to permit of a vertical swinging movement of the jaw mechanisms.

The jaws comprising the elements 168 and 169 may be successively closed, tilted upwardly, tilted downwardly and opened by means of apparatus comprising a head 174 which is movably mounted on the shaft 153 for vertical motion only. The head 174 is operatively associated with each of the blocks 159 through two connections, one of which comprises a link 175, the head-end thereof being provided with a small slot to permit of a slight sliding motion of the head 174 independent of the link 175. The other connection comprises a link 176, which has one end pivotally mounted on the head 174 and the other end on one arm 177 of a bell-crank lever, pivotally mounted on the block 159. The remaining arm 178 of the bell-crank lever is extended up through a perforation 179 formed in the slidable member 162. The head-end of the link 176 may be provided with a slot 181 as in the case of the link 175.

The head 174 is provided with an annular slot 182 at the lower end thereof adapted to receive a follower 183 which is carried by a slotted end portion 184 of a bell-crank lever arm 185, the other arm of which is connected by a link 186 with a lever 187 which is pivotally mounted on the pin 24. A roller 191 engages the periphery of a cam 192.

Figure 12:
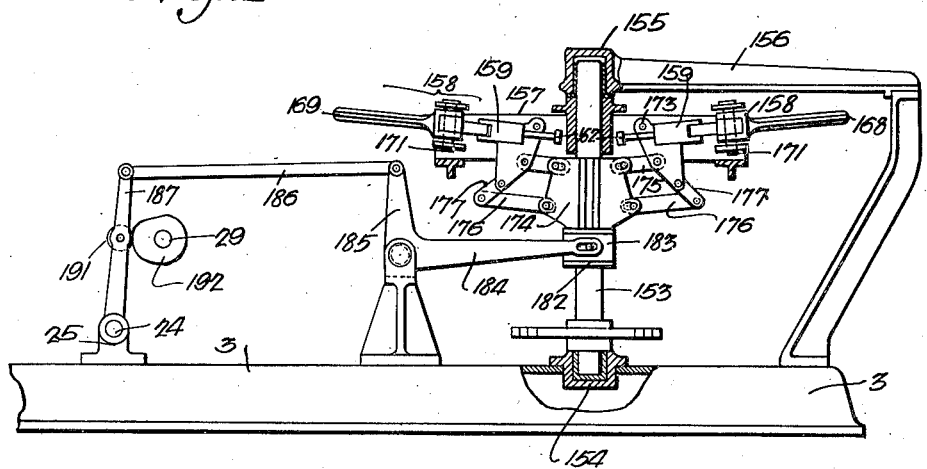
Fig. 12 is a view similar to Fig. 11 but with the jaws in the tilted position obtaining during the transfer of the molds from one predetermined point to another.
Figure 11:
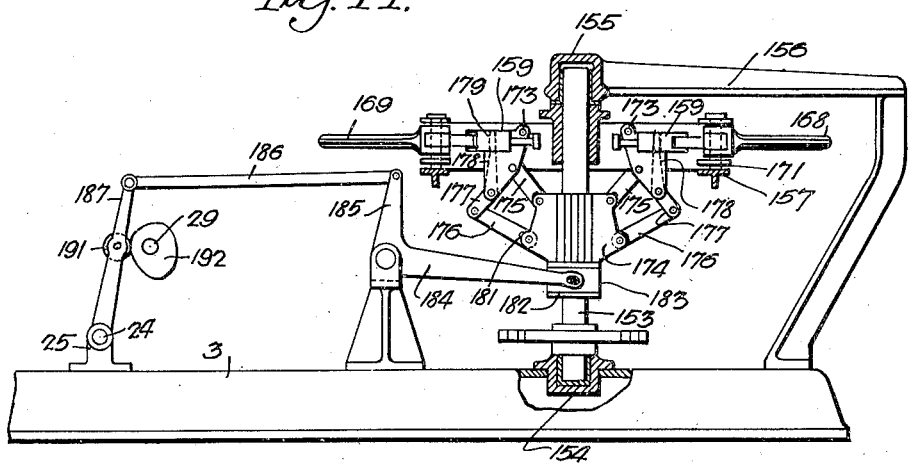
Fig. 11 is a detail, side elevational view, partially in section, of the automatic-feeding apparatus with the jaws thereof open to permit of the reception and discharge of the molds.
Figure 13:
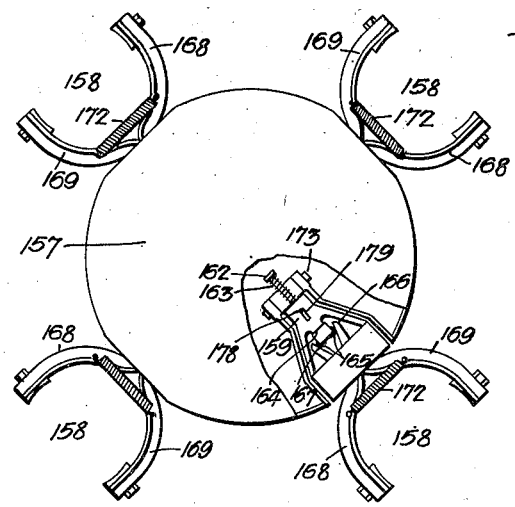
Fig. 13 is a somewhat enlarged, detail, top plan view of the mold-carrying jaws and supporting table, a portion of the latter being broken away.
Figure 14:
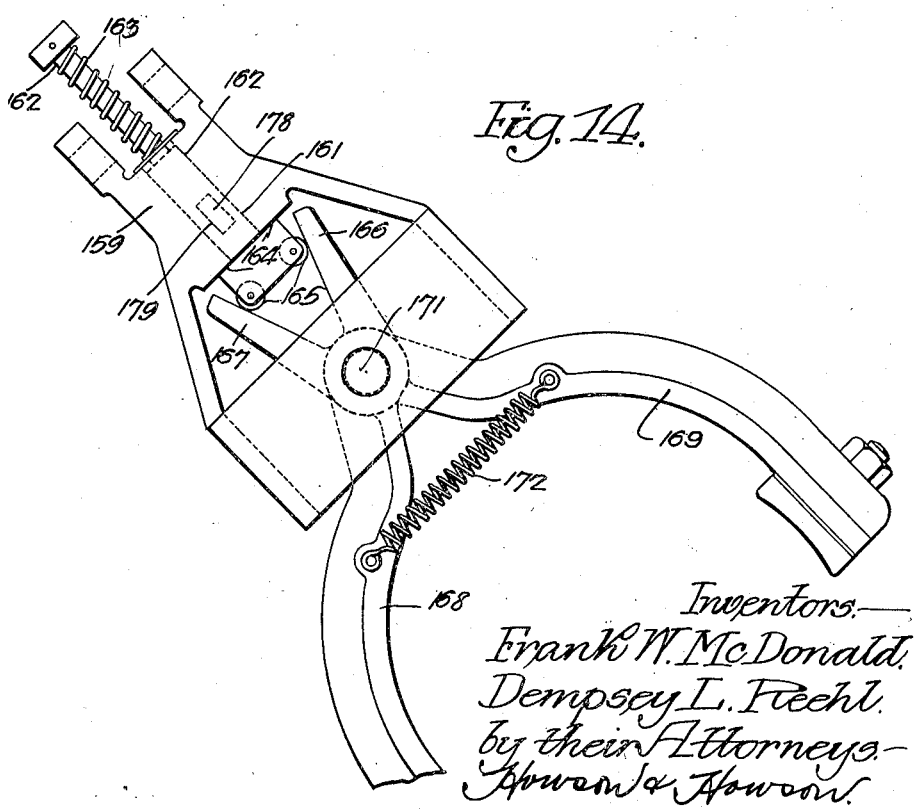
Fig. 14 is a greatly enlarged top plan view of the jaws shown in Fig. 13.

The design of the cam 192 is such that, when the cam 192 is in the position shown in Fig. 11, the head 174 is in its lowest position and the several jaws are completely open. Motion of the cam 192, however, causes an upward movement of the head 174 and the backward tilting of the bell-crank lever arm 178. The latter movement permits the spring 163 to move the sliding bar 162 backwardly and, as a result, the actuation together of the jaw elements 168 and 169 by the spring 172. Further motion of the cam 192 causes the head 174 to be raised still further, whereby the jaws are tilted, as shown in Fig. 12, and the molds raised out of the mold-holders. The jaws are maintained in this tilted position for a predetermined time interval, during which they are moved by mechanism, to be described more fully hereinafter, through an angle corresponding to the angular spacing of the mold-holders 109 and 125. As the cam 192 completes the revolution, the head 174 is lowered, causing the jaws to be successively tilted downwardly and then opened.

The shaft 153 may be intermittently actuated to move the jaws successively from one mold-holder to the other by means of an intermittently operating gear-wheel mechanism 193 (Fig. 5) which is actuated by a shaft 194 having an operative connection with the cam-shaft 29 through an interconnecting shaft 195. A pair of conveyors 196 and 197 operating toward and away from the automatic-feeding apparatus are positioned adjacent to the mold-holders 109 and 125, respectively, with the end portions in the path of travel of the jaws. The mold-holders 109 and 125 and the conveyors 196 and 197 are equiangularly positioned with respect to the vertical shaft 153, as in the case of the jaws.

In summary, the operation of our invention is as follows: The pug-mill 1 (Fig. 1) having been filled with clay and the cam-shaft motor 33 started, the circuit interrupter 38 (Fig. 4) operates to cause the periodic operation of the pug-mill driving motor 9, whereby a predetermined amount of clay may be forced therefrom through the die 6. The cam 27 then causes a movement of the wire 11 back and forth across the face of the die 6 to cut a disk of clay from the portion extending beyond the die 6. The disk falls upon the vertical swinging table 47. The cam 59 next comes into operation to cause a vertical turning movement of the table 47 through substantially an angle of 180° in order to transfer the disk from the table 47 to the batting-out head 65, whereupon the table 47 is returned to its initial position.

When the disk has been placed on the batting-out head 65, the cam 91, through the mechanism shown in Figs. 7 and 8, causes a horizontal swinging movement of the bat-finishing tool 66 from a position to one side of the batting-out head 65 to a position directly over the same. This position is maintained while the cam 106, (Fig. 9) effects the lowering and raising of the bat-finishing tool 66, whereupon the cam 91 causes a horizontal swinging movement of the bat-finishing tool 66 to its original position.

The cam 27 now operates to cause a vertical swinging movement of the batting-out head 65 about the horizontally positioned shaft 113 until the arm 112 strikes the stop member 122, whereupon the bat is thrown into the mold 108 which is positioned in the mold-holder 109. The batting-out head 65 now returns to its original position under the force of the spring 124.

The automatic feeding apparatus of Figs. 11, 12, 13 and 14 now comes into play with cam 192 causing the jaws to close on the molds positioned on the incoming conveyor 197 and on the mold-holders 109 and 125, and, subsequently, to tilt the same, whereby the molds may be lifted out of said mold-holders and from said incoming conveyor.

The intermittently operating gear-wheel mechanism 193, (Fig. 5) now operates to move the jaws horizontally through substantially an angle of 90°, bringing the mold from the incoming belt 197 directly over the mold-holder 109, the mold from the mold-holder 109 directly over the mold-holder 125 and the mold from the mold-holder 125 directly over the outgoing conveyor 196. The cam 192, which all the while has been maintaining the jaws in a tilted position, now operates to effect the lowering of the same, whereby the molds may be released on the parts just specified. During the time interval when the jaws are open, the cam 149 operates to bring the ware-finishing tool 126 through the mechanism shown in Fig. 10 into engagement with the bat in the mold-holder 125 to form the finished ware and thereafter to raise the ware-finishing tool 126 out of engagement therewith, whereupon the foregoing cycle of operations is completed.

In practice, we have found that it is desirable to spray a small quantity of water vapor on the bat and the ware while the tools are working on the same, and it should be applied just before the tools come into contact therewith and terminated just before the contact is broken. In order to simplify the description of our invention so far as possible, the mechanism for bringing about this desired result has not been shown.

While we have described but one form of embodiment of our invention and while we have pointed out certain of the most obvious principles and purposes thereof, we do not intend that the language employed in the following claims shall be limited to the precise features described, but we intend that the claims shall be construed to cover all combinations which are fairly included in the language thereof, when read in connection with the prior art, regardless of the details and functions mentioned in the description or illustrated in the drawing.

We claim:

1. In an apparatus for making ware, the combination with a die and means for forcing a desired material therethrough, of means for making a bat from the material forced through said die, a mold, means for transferring the bat to the mold, and means for operating on the bat to form the same into ware.

2. In apparatus of the character described, the combination with a die and means for forcing a desired material therethrough, of a batting-out head, means for transferring the material forced through said die to said batting-out head, means for operating on said material to form a bat, a mold, means for transferring the bat to the mold, and means for then operating on the bat to form the same into ware.

3. In apparatus of the character described, the combination with a die and means for forcing a desired amount of material therethrough, of means for cutting off a portion of the material forced through said die, means for operating on the cut-off portion to form a bat, a mold, means for transferring the bat to the mold, and means for then operating on the bat to form the same into ware.

4. In an automatic ware-making machine, a pug-mill having a die at the outlet thereof, means for cutting off a disk from the mass extending beyond said die, means for finishing one surface of said disk, a mold, means for positioning said disk to said mold with the unfinished surface exposed, a ware-finishing tool movable into and out of engagement with the unfinished surface of said disk, and mechanism periodically operable to convey said mold and disk away from said finishing tool.

5. In an automatic ware-making machine, the combination with a pug-mill, of disk-cutting means associated therewith, a table for receiving the disk, a batting-out head, means for moving the disk from said table to said batting-out head, a bat-finishing tool movable into and out of engagement with the disk, a mold, means for moving the disk from the batting-out head to the mold, a ware-finishing tool, mechanism for moving the disk and the mold into operative relation with said ware-finishing tool, and means for moving said ware-finishing tool into and out of engagement with said disk, said mechanism being operable to replace the removed mold as it is moved toward said finishing tool.

6. In an automatic ware-making machine, a pug-mill having a die at the outlet thereof, means for cutting off a disk of the desired material from the mass extending beyond said die, a finishing tool, mechanism for moving said tool into and out of engagement with one surface of said disk to finish the same, a mold, automatic means for positioning said disk in said mold with the unfinished surface thereof exposed, a ware-finishing tool automatically movable into and out of engagement with the unfinished surface of said disk, and automatic mechanism operable to move said mold and finished disk away from said finishing tool.

7. In an automatic ware-making machine, a pug-mill periodically operable to force through the outlet thereof a desired amount of material, cutting mechanism automatically operable to remove a predetermined portion of the material extending beyond said pug-mill outlet, a bat-finishing tool, automatic mechanism for moving said tool into and out of engagement with one surface of said removed material to form a bat, a mold, automatic means for positioning said bat in said mold with the unfinished surface thereof exposed, a ware-finishing tool automatically movable into and out of engagement with the unfinished surface of said bat, and automatic mechanism operable to move said mold and finished bat away from said ware-finishing tool, the foregoing operations occurring in timed sequence.

8. In an automatic ware-making machine, a pug-mill periodically operable to force through the outlet thereof a desired amount of material, cutting mechanism operable to remove a predetermined portion of the material extending through the pug-mill outlet, means for making a bat of said removed material, a mold, means for transferring the bat to said mold, and means operable to form the bat into ware, the foregoing operation occurring in predetermined sequence.

9. In a ware-making machine, a pug-mill having a die at the outlet thereof, means for cutting off a disk of the desired material from the mass extending beyond said die, means operable to form said disk into a bat, a mold holder support, a mold adapted to receive said bat, a second mold holder, a ware-finishing tool positioned immediately adjacent to said second mold holder, and mechanism operable to move the bat and the mold from one holder to the other and to subsequently discharge the bat as finished ware.

10. In a ware-making machine, a pug-mill having a die at the outlet thereof, means for cutting off a disk of the desired material from the mass extending beyond said die, means operable to form said disk into a bat, a mold holder supporting a mold, a batting-out head operable to throw the bat into said mold, a second mold holder, a ware-finishing tool positioned immediately adjacent to said second mold holder, and mechanism operable to move the bat and the mold from said first-mentioned holder to said second-mentioned holder and to subsequently discharge the bat as finished ware.

11. In an automatic ware-making machine, a pug-mill having a die at the outlet thereof, means for cutting off a disk of the desired material from the mass extending beyond said die, means operable to form said disk into a bat, a mold holder supporting a mold, a batting-out head operable to throw the bat into said mold, a second mold holder, a ware-finishing tool positioned immediately adjacent thereto, and mechanism operable to lift the mold and the bat out of said first-mentioned holder, to move the same to said second holder and to deposit it therein, said mechanism being also operable to discharge said bat as finished ware.

12. In an automatic ware-making machine, the combination with a pug-mill, of disk-cutting means associated therewith, a table for receiving the disk, a batting-out head, means for turning the table an amount sufficient to transfer the disk to said batting-out head, a bat-finishing tool movable into engagement with said disk, a mold, means for turning the batting-out head sufficient to transfer the disk to said mold and a ware-finishing tool movable into and out of engagement with said disk.

13. In a ware-making machine, a horizontally positioned table, a plurality of pivotally mounted arms supporting the same in such manner as to provide for a horizontal reciprocal movement of the table, means for periodically reciprocating said table, and a second table positioned immediately above said first-mentioned table and operatively associated therewith, whereby movement of the first-mentioned table causes a turning movement of the second-mentioned table.

14. In a ware-making machine, a horizontally positioned table, a plurality of arms for supporting said table in such manner as to provide for a horizontal movement thereof, a second table pivotally mounted on a shaft carried by said first-mentioned table, a pinion on said shaft, a rigidly positioned segmental gear adapted to mesh with said pinion, and means for periodically reciprocating said first-mentioned table, whereby a predetermined vertical turning movement of said second-mentioned table may ensue.

15. In a ware-making machine, a batting-out head, a shaft, an arm pivotally mounted on said shaft and carrying said batting-out head on the outer end thereof, a projecting lug rigidly secured to said shaft, a resilient connection between said lug and said arm, a pinion rigidly secured on said shaft, a pivotally mounted gear meshing with said pinion, and means for moving the gear according to a predetermined sequence, whereby the batting-out head may be moved through an arc of predetermined extent.

16. In a ware-making machine, a batting-out head, a shaft, an arm pivotally mounted on said shaft and carrying said batting-out head on the outer end thereof, a projecting lug rigidly secured to said shaft, a resilient connection between said lug and said arm, a pinion rigidly secured on said shaft, a pivotally mounted gear meshing with said pinion, means for periodically actuating the gear to cause a vertical turning movement of said batting-out head, means for limiting the forward movement of said batting-out head, and means for returning said batting-out head to its original position upon engagement with said last-mentioned means.

17. In an automatic ware-making machine, a vertically positioned shaft, means for intermittently turning said shaft, a plurality of jaws carried by said shaft operable to open, to close and to tilt, and a pair of mold holders and a pair of conveyors positioned in the path of travel of said jaws, whereby molds may be moved by said jaws from one holder to the other, from the latter to one of said pair of conveyors and from the other of said conveyors to said first-mentioned mold holder.

18. In an automatic ware-making machine, a vertically positioned shaft, means for intermittently turning said shaft, a plurality of jaws carried by said shaft operable to open, to close and to tilt upwardly and downwardly, and a pair of mold holders and a pair of conveyors positioned in the path of travel of said jaws, said conveyors operating, respectively, toward and away from said jaws, whereby the molds may be moved from one holder to the other, from the latter holder to said outgoing conveyor and from said incoming conveyor to said first-mentioned holder.

19. In a ware-making machine, the combination with a vertically positioned shaft carrying supporting means, of a plurality of jaws pivotally mounted thereon, an operating member movably mounted on said shaft, means actuated by said operating member for closing, tilting and opening said jaws, and means for acuating said shaft to turn said jaws only while the jaws are tilted.

20. In a ware-making machine, the combination with a vertically positioned shaft carrying supporting means, of a plurality of jaws pivotally mounted thereon, means for successively closing, tilting upwardly, tilting downwardly and opening said jaws, and intermittently actuating mechanism operable to revolve said support only while said jaws are tilted upwardly.

21. In a ware-making machine, the combination with a vertically positioned shaft carrying supporting means, of a plurality of jaws pivotally mounted thereon and substantially equiangularly spaced with respect to said shaft, a mold holder containing a mold, a batting-out head operable to transfer a bat therefrom to said mold, said mold holder being in the path of travel of said jaws, a ware-finishing tool, a second mold holder positioned in operative relation to said tool and also in the path of travel of said jaws, conveyors operating toward and away from said jaws and positioned in the path of travel thereof, said mold holders and conveyors being also substantially equiangularly spaced with respect to said shaft, and mechanism for closing, tilting and opening said jaws and for intermittently actuating said shaft, whereby the molds may be moved from one mold holder to the other and to and from said conveyors.

22. In combination, a shaft, an arm rigidly secured thereto, a block pivotally mounted on said arm and provided with a longitudinally extending recess adapted to provide a slidable mounting for a bar, one end of said bar being provided with rollers, a pair of elements constituting a jaw pivotally mounted on said block and provided with extensions adapted to engage said rollers, resilient means for opposing motion of said bar, and means for actuating said bar to correspondingly actuate said jaw elements.

23. In combination, a shaft, a supporting member rigidly secured thereto, a block pivotally mounted on said supporting member and provided with a longitudinally extending recess adapted to provide a slidable mounting for a bar, one end of said bar being provided with rollers, a pair of elements constituting a jaw pivotally mounted on said block and provided with extensions adapted to engage said rollers, resilient means for opposing motion of said bar and said jaw elements, a slidable head on said shaft, cam mechanism for raising and lowering said head according to a predetermined sequence and mechanism operatively associating said block and said bar, whereby said jaw may be successively closed and tilted.

24. Apparatus comprising a cutting element, a movable supporting lever therefor, an actuating lever providing a pivoted support for said movable lever, a track, and anti-friction means for operatively associating said track and said movable supporting lever.

25. Apparatus comprising a cutting element, a movable supporting lever therefor, an actuating lever providing a pivoted support for said movable lever, a track, anti-friction means for operatively associating said track and said movable supporting lever, and means carried by said lever for causing one of the same to be resiliently associated with said track.

26. In combination, a die, means for forcing a desired material therethrough, means for actuating said first-mentioned means, a cutting element, a shaft carrying a cam, linkage so operatively associating said cutting element and said cam that the latter causes the reciprocation of said cutting element across the face of said die, and means actuated by said shaft to cause the periodic energization of said second-mentioned means.

27. In combination, a pug-mill having a die, a driving motor for said pug-mill, means for cutting off a disk from the mass forced through said die, a shaft having a cam, means for causing the operation of said cutting element by said cam, and means operated by said shaft for controlling the periodic energization of said driving motor.

28. In apparatus of the character described, the combination with a die and means for forcing a desired amount of material therethrough, of means for cutting off a portion of the material forced through said die, means for operating on the cut-off portion to form a bat, a mold, means for transferring the bat to the mold, means for then operating on the bat to form the same into ware, and a common cam shaft operable to control said means.

29. In a ware-making machine, a table positioned for horizontal movement, a second table pivotally mounted on said first-mentioned table, and means whereby the movement of said first-mentioned table may cause a turning movement of said second-mentioned table.

30. In a ware-making machine, a table positioned for horizontal movement, a second table, means affording a pivotal mounting for said second table, said means including a shaft, a pinion on said shaft, and a cooperating rigidly positioned gear element, whereby a movement of said first-mentioned table may cause a turning movement of said second-mentioned table.

31. In combination, a table mounted on a plurality of arms affording a reciprocating movement, a shaft extending between certain of said arms and rigidly secured thereto, means for rocking said shaft to cause said reciprocating movement, a second table, and means whereby the movement of said first-mentioned table may cause a turning movement of said second-mentioned table.

32. In a device of the class described, a shaft, a member adapted to support a disk, said member being pivotally mounted on said shaft, an abutment limiting the movement of said member, and means operatively associating said member and said shaft, whereby said disk may be thrown from said member as the latter strikes said abutment.

33. Apparatus comprising a shaft, a member adapted to support a disk, said member being pivotally mounted on said shaft, an abutment for limiting the movement of said member, and means for operatively associating said member and said shaft whereby said disk may be thrown from said member as the latter strikes said abutment, said means being adjustable to vary the force with which said disk is thrown from said member.

34. Apparatus comprising a shaft, a member adapted to support a disk, said member being pivotally mounted on said shaft, an abutment for limiting the movement of said member, resilient means for operatively associating said member and said shaft whereby said disk may be thrown from said member as the latter strikes said abutment, said means being adjustable to vary the force with which said disk is thrown from said member.

35. Apparatus comprising a shaft, a member adapted to support a disk, said member being pivotally mounted on said shaft, an abutment for limiting the movement of said member, a pinion rigidly secured to said shaft, an actuating gear wheel element meshing with said pinion, and means for operatively associating said member and said shaft, whereby said disk may be thrown from said member as the latter strikes said abutment.

36. In combination, a shaft having a supporting arm secured thereto, a block pivotally mounted on said arm and carrying a pair of elements constituting a jaw, a movable operating member, linkage operatively associating said operating member and said block for moving the latter with respect to said supporting arm, and means actuated by said operating member for opening and closing said jaw.

37. Apparatus comprising a shaft, an arm rigidly secured thereto, a block pivotally mounted on said arm, a pair of elements constituting a jaw pivotally mounted on said block, an operating member, linkage operably associating said operating member and said block, whereby the latter may be tilted with respect to said supporting arm, a bell-crank lever pivotally mounted on said block, means for operably associating one arm of said bell-crank lever and said movable operating member, and means for operatively associating the other arm of said bell-crank lever and said jaw elements, whereby the latter may be opened and closed in accordance with the actuation of said movable operating member.

FRANK W. McDONALD.
DEMPSEY L. REEHL.